(No Model.) 2 Sheets—Sheet 2.
C. H. WILSON.
METHOD OF LAYING ELECTRIC CABLES.
No. 446,214. Patented Feb. 10, 1891.
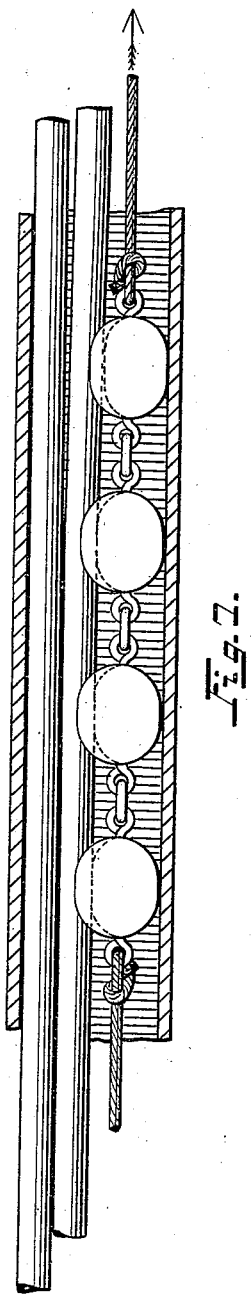
Witnesses.
Charles G. Hawley.
George A. Parker.
Inventor
Charles H. Wilson.
By George A. Barton
Attorney

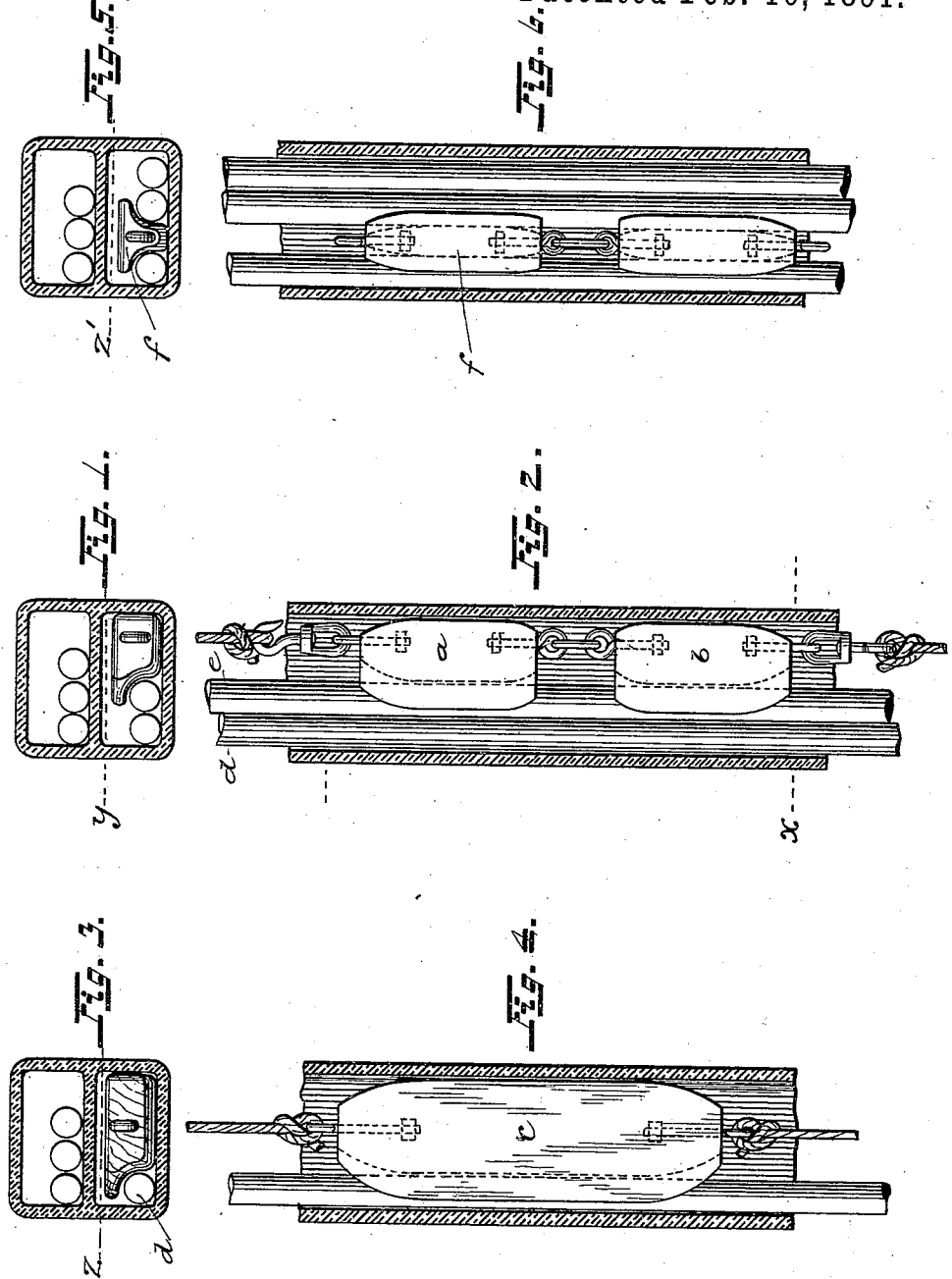

UNITED STATES PATENT OFFICE.

CHARLES H. WILSON, OF CHICAGO, ILLINOIS.

METHOD OF LAYING ELECTRIC CABLES.

SPECIFICATION forming part of Letters Patent No. 446,214, dated February 10, 1891.

Application filed September 19, 1889. Renewed January 5, 1891. Serial No. 376,710. (No model.)

*To all whom it may concern:*

Be it known that I, CHARLES H. WILSON, a citizen of the United States, residing at Chicago, in the county of Cook and State of Illinois, have invented a certain new and useful Improvement in Methods of Placing Electric Cables in Conduits, of which the following is a full, clear, concise, and exact description, reference being had to the accompanying drawings, forming a part of this specification.

My invention relates to drawing electric cables into conduits and arranging the different cables of a conduit with relation to one another so that the whole space within the conduit may be utilized, while at the same time the cables are made to spread apart to permit of the pulling in or out of any one of the cables. The conduits may be formed of tile, each length or section of tile having preferably two openings which may be rectangular in form. Thus the ducts will be provided with flat bottoms for supporting the cables when drawn therein. The cables of each duct are necessarily drawn in one at a time, and it is therefore essential that there shall be no harmful rubbing of a cable that is being drawn in (or out, as the case may be) against any other cable in the same duct.

My invention consists in blocks or wedges as used in the conduit for the purpose of arranging the cables in line throughout the length of the duct, so that one cable may be drawn in after another without obstructing and without abrading one another and so that any cable may be drawn out likewise without injury or unnecessary friction.

My invention is illustrated in the accompanying drawings, in which—

Figure 1 is a sectional view of a tile electric subway upon line $x$ of Fig. 2, having two ducts, the preferable form of my wedge being shown in the lower duct as in the act of passing through the same to crowd the second cable into place. Fig. 2 is a plan view of the same as seen from section-line $y$ of Fig. 1. Fig. 3 is a view showing a transverse sectional view of a subway the same as shown in Fig. 1, one cable only, however, being shown in the lower duct and the wedge being shown as in the act of forcing this cable to one side so as to make room for succeeding cables. Fig. 4 is a top view of a wedge as seen from section-line $z$ of Fig. 3, the wedge consisting of only one block. Fig. 5 is a transverse sectional view of a subway having two ducts, three cables being shown in each and a wedge being shown as in the act of spreading the cables to permit of the withdrawal of one of them. Fig. 6 is a top view of the spreading-wedge as seen from section-line $z'$ of Fig. 5. Fig. 7 is a view of my linked wedge, the different blocks thereof gradually increasing in size.

Like parts are indicated by similar letters of reference throughout the different figures.

The block or wedge shown in Fig. 2 consists of two parts $a$ and $b$ linked together. I have found this form preferable to the form shown in Fig. 4, consisting of a single block $c$, with a pressing-surface long enough to bear against the cables to straighten the same. The block $c$ I have used with success, but prefer the double block having two pressing-surfaces adapted to press simultaneously against the cable.

I do not limit my invention to either one or two blocks, as a larger number of blocks linked together and preferably gradually increasing in size may be in some cases found more satisfactory. The smaller or narrower blocks should be placed ahead or in front of the larger blocks for the purpose of wedging the cables, gradually forming what may be termed a "linked" wedge.

It will be seen, as shown in Figs. 1 and 3, that the side of the block next to the cable is hollowed out or grooved to conform to the surface of the cable and form a sliding bearing-surface adapted to be forced against the cable to straighten the same and move the same to any desired position in the duct. These blocks are preferably constructed of hard wood and are lubricated with grease in order that they may slide into the duct easily and not damage the cable. Thus in practice the first cable $d$ is drawn in and then the block $c$, of suitable size, is drawn through, as shown in Figs. 3 and 4, and the cable $d$ is thus straightened and wedged over to one side of the duct so as to make room for a succeeding cable $e$. The second cable $e$ is then drawn in, as shown in Fig. 1, and afterward a block, as $b\ c$, of suitable width, is drawn through to force the cable e over against the cable d and into alignment therewith, and thereafter the third and subsequent cables are drawn in. I preferably pass a wedge or block of suitable size through the duct to force each cable into place before another cable is drawn in and then attach the same block to the clevis at the end of the next cable, so as to prevent it by any chance from injuring the preceding one.

When the cables are in place they lie side by side, as shown in the upper ducts of Figs. 1, 3, and 5, but not necessarily on one side of the duct, for should it be found desirable a part of the cables may be placed on one side of the duct and part upon the other, the wedges in every case being made to conform to the space which it is desired to leave between the cables or between the walls of the duct and the cables.

A little margin should be left, as shown, so that any cable may be separated a short distance from the other before being drawn out, it frequently happening that a cable must be removed for repairs or otherwise.

As shown in Figs. 5 and 6, a wedge f, of the form shown, may be drawn through between any two of the cables so as to separate them, in order to permit the ready removal of one without injury to other cables or undue friction.

Having thus described my invention, I claim as new and desire to secure by Letters Patent—

1. The combination, with an underground conduit, of blocks or wedges adapted to be drawn through said conduit to arrange the cables within said conduit with respect to one another to permit of the drawing in or removal of one cable after another without injury to the cables or undue friction or obstruction, substantially as and for the purpose specified.

2. The method of placing several cables in an underground conduit, which consists in drawing in one cable, then passing a block or wedge through the conduit, and thereby forcing the cable to one side, and afterward drawing in the second cable, the same block or wedge preceding the second cable, and thereby making a second passage through the conduit, the other cable or cables being then drawn in and arranged in place, blocks of suitable size being drawn through as in the first instance, whereby undue friction and all obstructions and injury are prevented, substantially as and for the purpose specified.

3. A linked wedge, each of the blocks or links thereof being hollowed out to conform to the shape of the cables, said linked wedge being adapted to be drawn through a conduit containing cables to arrange the cables in position within the conduit, substantially as and for the purpose specified.

4. A linked wedge consisting of blocks gradually increasing in size and hollowed out to conform to the shape of the cables, said linked wedge being adapted to be drawn through a conduit to bring the cables into position, substantially as and for the purpose specified.

5. A duct containing cables partially filling the same, and a movable wedge corresponding in size to the margin or space remaining in the duct, said wedge being combined with said duct, substantially as and for the purpose specified.

In witness whereof I hereunto subscribe my name this 16th day of September, A. D. 1889.

CHARLES H. WILSON.

Witnesses:
GEORGE P. BARTON,
ELLA EDLER.